United States Patent [19]
Nakamura

[11] 3,780,275
[45] Dec. 18, 1973

[54] DEVICE TO GENERATE PSEUDO-RANDOM MULTI-LEVEL PULSE SEQUENCE

[75] Inventor: Katsuhiro Nakamura, Tokyo, Japan

[73] Assignee: Nippon Electric Company, Limited, Tokyo, Japan

[22] Filed: July 7, 1971

[21] Appl. No.: 160,495

[30] Foreign Application Priority Data

July 8, 1970 Japan .............................. 45/60095

[52] U.S. Cl. ................................ 235/152, 235/197
[51] Int. Cl. ............................................ G06f 1/02
[58] Field of Search .......................... 235/152, 197; 328/60, 61; 331/78; 307/209

[56] References Cited

UNITED STATES PATENTS

| | | | |
|---|---|---|---|
| 3,557,356 | 1/1971 | Balza et al. | 235/152 |
| 3,124,753 | 3/1964 | Gieseler | 328/61 |
| 3,614,399 | 10/1971 | Linz | 235/152 |

*Primary Examiner*—Malcolm A. Morrison
*Assistant Examiner*—James F. Gottman
*Attorney*—Richard C. Sughrue et al.

[57] ABSTRACT

A device for generating a random pulse sequence provides the randomness of the occurrence of each pulse level in the pulse sequence. In general, it is known that the randomness of the binary pulse train is achieved by logical circuits operating on the Galois field GF(2). However, how to generate a random multi-level pulse train was not known heretofore. The multi-level pulse generator presented here comprises unit delay elements such as flip-flops arranged in a plurality of lines and rows and logical circuits to perform logical operations on the outputs from the unit delay elements on the Galois extension field $GF(p^k)$. ($p$ is a prime number)

The randomness of this output is mathematically assured.

5 Claims, 20 Drawing Figures

INVENTOR
KATSUHIRO NAKAMURA

BY Sughrue, Rothwell, Mion, Zinn & Macpeak

ATTORNEYS

DEVICE TO GENERATE PSEUDO-RANDOM MULTI-LEVEL PULSE SEQUENCE

BACKGROUND OF THE INVENTION

This invention relates to a device to generate a random pulse sequence, and particularly a random pulse sequence of multi-level.

Heretofore, a random multi-level pulse sequence generator comprised a binary random pulse sequence generator, a serial-parallel converter and a multi-level converter.

The pseudo-random binary pulse train from the generator is converted into a plurality of binary parallel pulse trains in the series-parallel converter. The number of these plural binary parallel pulses corresponds to the number of levels to be converted. Thereafter, the parallel pulse trains are combined with each other in accordance with the logical rule in the multi-level converter. The logical rule used here is predetermined according to the various combinations of patterns in binary pulse trains at each time instance.

However, the randomness of the multi-level pulse sequence thus obtained has not been satisfactory as will be hereinafter described, and furthermore it is not assured mathematically.

SUMMARY OF THE INVENTION

An object of this invention is to provide a device to generate a multi-level pulse sequence which is substantially random in the occurrence of each level, furthermore, this randomness is mathematically assured.

According to this invention a pseudo-random multi-level pulse sequence generator is provided which comprises, m columns of unit delay means for storing m output state vector $X_i$ where $i = 1, 2 \ldots m$, which are elements of a Galois field, means for individually multiplying the output state vector $X_m$ from the last column of unit delay means by each $h_i$, where $i = 0, 1, 2 \ldots m-1$ and where each $h_i$ is an element of the same Galois extension field and multiplication is over the Galois extension field, means for adding over the Galois extension field $Y_i$ and $X_i$ for $i = 1, 2 \ldots m-1$, where $Y_i$ is the product of $X_m$ and $h_i$, and periodically shifting the resultant sum to the column $i+1$ delay unit means, the resultant sum being the new $X_{i+1}$, means for periodically shifting $Y_o$, which is the product of $X_m$ and $h_o$ into the first ($i = 1$) column of unit delay means to form the new state vector $X_i$, and means for converting the element $Y_o$ into a multi-level pulse, wherein said multiplying means may be a direct input output connection for $h_i = 1$ and the absence of any connection for $h_i = 0$.

DESCRIPTION OF THE PREFERRED EMBODIMENT

Figure 1:
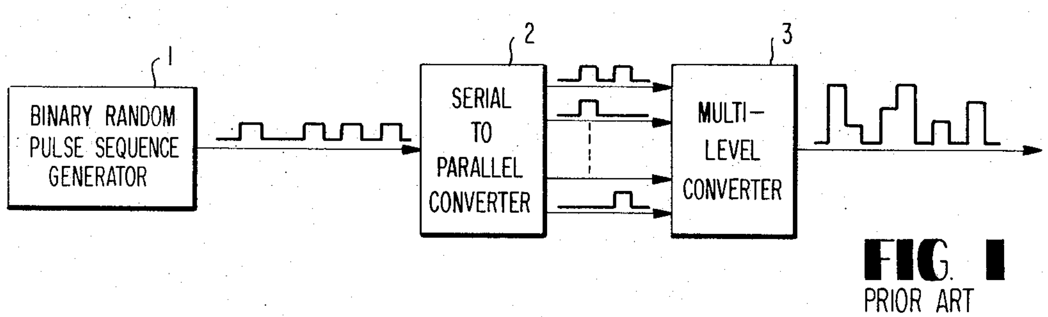
FIG. 1 PRIOR ART
FIG. 1 is a block diagram showing a conventional device to generate pseudo-random multi-level pulse sequences.

FIG. 1 represents the prior art random multi-level pulse sequence generator as described in the above background section. The generator includes the binary random pulse sequence generator 1, the serial-parallel converter 2, and the multi-level converter 3. As mentioned before, the pseudo-random multi-level pulse generator according to this invention is composed in the following manner. Firstly, there are selected a plurality of unit delay elements which can store p-states for storing one of plural states.

The plurality of the unit delay elements are arranged in $k$-lines and m-columns. In this case, $p$ must be a prime number. Since the number of lines of the unit delay elements is $k$, the content in each column of the unit delay elements corresponds to an element over the Galois extension field $G(p^k)$, well known in the modern algebra.

Then logical operations over $GF(p^k)$ are performed on those elements of $GF(p^k)$.

Let these elements of $GF(p^k)$ be denoted as $A_1, A_2, \ldots, A_m$ from the first column to the $m$-th column. Therefore, the element of the $m$-th column, that is, the final one is represented as $A_m$. The element $A_m$ is respectively multiplied on $GF(p^k)$ by the parameters $h_0, h_1, \ldots, h_{m-1}$, which are also the elements of $GF(p^k)$.

The product of $h_0$ and $A_m$ is fed back to the first column of the unit delay elements, while the products of $h_1$ and $A_m$, $h_2$ and $A_m$, ..., $h_{m-1}$ and $A_m$ are supplied to adders modulo p, wherein the products are summed with the outputs from the first, second, ... $m-1$ th columns in the unit delay elements, respectively. And thereafter, the results are supplied to the corresponding subsequent column. Additionally, the product of $h_0$ and $A_m$ is simultaneously converted into a multi-level pulse sequence.

The selection of the parameters $h_0, h_1, \ldots, h_{m-1}$ will hereinafter be clarified.

Figure 2:
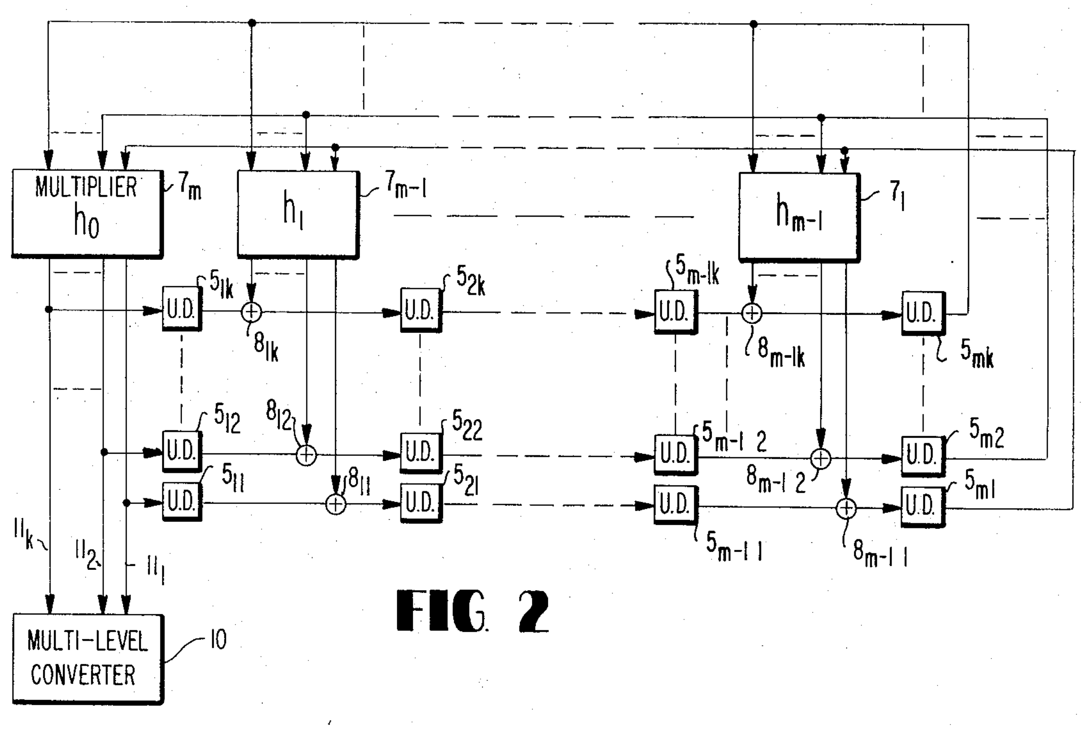
FIG. 2 is a block diagram showing an example of device to generate a pseudo-random multi-level pulse sequence according to the present invention.

Referring to FIG. 2 and others, some embodiments of this invention will be described hereinafter.

At first consider the case that the number of levels is a power of 2, such as $2^2(=4$ levels), $2^3(=8$ levels), $2^4(=16$ levels), for simplicity, i.e. the case where $p=2$.

Each of $2^k$ levels in pulse trains can be represented by $k$-dimensional binary vectors which elements correspond to the states 1 and 0 of $k$ binary unit-delay elements arranged in parallel.

As shown in FIG. 2, unit delay elements (5) are arranged in $k$ lines and in m columns ($m$ is positive integer). In other words, that the $k$-lines of unit delay elements, that is, $5_{11}, 5_{21}, \ldots 5_{m-11}, 5_{m1}, 5_{12}, 5_{22}, \ldots 5_{m-12}, 5_{m2}, \ldots 5_{1k}, 5_{2k}, \ldots 5_{m-1k}, 5_{mk}$ are provided. The states "1" and "0" of $k$ unit delay elements $5_{i1}, 5_{i2}, \ldots 5_{ik}$ ($i = 1, 2, \ldots$ m) in the ith column may express one of $2^k$ state vectors. The state vector of $k$ unit delay elements will hereinafter be expressed by $$Xi = (x_{i1}, x_{i2}, \ldots x_{ik})$$

where $x_i = 1$ or $0$, $i = 1, 2, \ldots m$.

There are provided multipliers $7_m, 7_{m-1}, \ldots 7_1$ equal to the number of columns of the arrangement of the unit delay elements (5). The multipliers (5) are not normal multipliers but are multipliers over the Galois extension field $GF(2^k)$ well known in modern algebra.

The multiplying rule over the Galois extension field, for instance, $GF(2^2)$ is shown in Table 1, wherein the $2^2=4$ elements, that is $(0,0)=0$, $(0,1)=1$, $(1,0)=\alpha$ and $(1,1)=\alpha^2$ of the Galois extension field $GF(2^2)$ are indicated by $a$, $b$, $c$ and $d$, respectively. In the table the product of any two elements is found by locating the intersection of a vertical line extending from one element in the upper row and a horizontal line extending from the other element in the left most column.

TABLE 1

| X | a | b | c | d |
|---|---|---|---|---|
| a | a | a | a | a |
| b | a | b | c | d |
| c | a | c | d | b |
| d | a | d | b | c |

These multipliers $7_i$ multiply the outputs of the corresponding stage of the shift registers by the constant $h_i$.

The constant $h_i$ is an element on the Galois extension field $GF(2^k)$. For example, in case of $GF(2^2)$, this is expressed by one of $(0,0)=0$, $(0,1)=1$, $(1,0)=\alpha$, and $(1,1)=\alpha^2$. Generally speaking, the multiplication on $GF(p^k)$ ($p$ is a prime number) can be performed using multipliers and adders mod $p$. This is explained later by an example. For the detailed description, refer to the document (1) "Algebraic Coding Theory" authored by E.R. Berlekamp, pp. 44–46.

Next, consider how to determine the constant parameter $h_i$ ($i=0, 1, 2, \ldots, m-1$) of $GF(2^k)$ in detail. Consider polynominal $h(x) = x^m - h_{m-1}x^{m-1} - h_{m-2}x^{m-2} — h_1x - h_0$.

This polynomial is hereinafter called a "tap polynomial."

The addition and multiplication in the expression of the tap polynomial are performed on $GF(2^k)$.

In the polynomial, the constant $h_i$'s ($i = 1, 2, \ldots, m-1$) are selected so that the polynomial satisfies the following conditions:

1. There exists no such a polynomial with coefficients from $GF(2^k)$, of a degree more than one that divides $h(x)$.
2. $h(x)$ divides $x^n - 1$ if $n = (2^k)^m - 1$, but does not divide $x^n - 1$ if $n < (2^k)^m - 1$.

The division here is, of course, performed on $GF(2^k)$. The polynomial $h(x)$ satisfying these conditions can be easily searched by a computer. Eventhough, the number of such a polynomial will increase enormously as the degree $m$ increases, some examples of such a tap polynomial will be tabulated.

1 In case of $GF(2^2)$; 4 levels

The elements of $GF(2^2)$ can be represented as $(0,0)=0$, $(0,1)=1$, $(1,0)=\alpha$, and $(1,1)=\alpha^2$, respectively, in accordance with the reference (1) mentioned before.

| degree | Example of the Tap polynomial $h(x)$ |
|---|---|
| 2 | $x^2—x—\alpha$, $x^2—x—\alpha^2$, $x^2—\alpha x—\alpha$ |
| 3 | $x^3—x^2—x—\alpha$, $x^3—x^2—\alpha x—\alpha^2$, $x^3—x^2—\alpha^2x—\alpha$ |
| 4 | $x^4—x^2—\alpha x—\alpha^2$, $x^4—\alpha x^2—\alpha x—\alpha$ |
| 5 | $x^5—x—\alpha$, $x^5—\alpha x—\alpha$, $x^5—\alpha^2x^2—\alpha x—\alpha^2$ |
| 6 | $x^6—x^2—x—\alpha$, $x^6—\alpha x^2—\alpha^2x—\alpha$ |
| 7 | $x^7—x^2—\alpha x—\alpha^2$, $x^7—x^2—\alpha^2x—\alpha$ |
| 8 | $x^8—x^3—x—\alpha$, $x^8—x^3—x—\alpha^2$ |
| 9 | $x^9—x^2—x—\alpha$, $x^9—x^2—x—\alpha^2$ |
| 10 | $x^{10}—x^3—\alpha x^2—\alpha^2$ |

2. In case of $GF(2^3)$; 8 levels

Similarly, the elements of $GF(2^k)$ can be represented as $(0,0,1)=1$, $(0,1,0)=\alpha$, $(1,0,0)=\alpha^2$, $(0,1,1)=\alpha^3$, $(1,1,0)=\alpha^4$, $(1,1,1)=\alpha^5$, and $(1,0,1)=\alpha^6$, respectively.

| degree | Example of the Tap polynomial $h(x)$ |
|---|---|
| 2 | $x^2—x—\alpha^3$, $x^2—x—\alpha^6$ |
| 3 | $x^3—x—\alpha$, $x^3—x—\alpha^4$ |
| 4 | $x^4—x—\alpha^3$, $x^4—x—\alpha^5$ |
| 5 | $x^5—x^2—x—\alpha^6$ |
| 6 | $x^6—x—\alpha^2$ |

3. In case of $GF(2^4)$; 16 levels

The elements of $GF(2^4)$ can be represented as
$(0,0,0,0)=0$, $(0,0,0,1)=1$, $(0,0,1,0)=\alpha$
$(0,1,0,0)=\alpha^2$, $(1,0,0,0)=\alpha^3$, $(0,0,1,1)=\alpha^4$
$(0,1,1,0)=\alpha^5$, $(1,1,0,0)=\alpha^6$, $(1,0,1,1)=\alpha^7$
$(0,1,0,1)=\alpha^8$, $(1,0,1,0)=\alpha^9$, $(0,1,1,1)=\alpha^{10}$
$(1,1,1,0)=\alpha^{11}$, $(1,1,1,1)=\alpha^{12}$, $(1,1,0,1)=\alpha^{13}$,
$(1,0,0,1)=\alpha^{14}$

| degree | Example of the Tap polynomial h(x) |
|---|---|
| 2 | $x^2—x—\alpha^7$, $x^2—x—\alpha^{11}$ |
| 3 | $x^3—x—\alpha^7$, $x^3—x—\alpha^{14}$ |
| 4 | $x^4—x^2—\alpha x—\alpha^2$, $x^4—x^2—\alpha x—\alpha^7$ |
| 5 | $x^5—\alpha x—\alpha^2$ |

Returning to FIG. 2, assuming that the outputs of the multiplier $7_m$ are represented as the state vector $Y_m = (y_{m1}, y_{m2}, \ldots y_{mk})$, the elements are supplied to the initial column consisting of the unit delay elements $5_{11}, 5_{12}, \ldots 5_{1k}$ while the outputs of the other multipliers $7_{m-1}, \ldots 7_1$ and the outputs of the respective delay elements of first, . . . $(m-1)$th columns are summed on the Galois extension field $GF(2^k)$, and thereafter the outputs of adders supplied to the respective delay elements of the second, . . . $m$th columns. The addition on the Galois extension field $GF(2^k)$ may be performed by exclusive OR wherein elements of one state vector are summed to the corresponding elements of the other state vector.

Therefore, the elements $y_{m-11}, y_{m-12}, \ldots y_{m-1k}$ of the output $Y_{m-1}$ of the multiplying circuit $7_{m-1}$ are respectively supplied to the exclusive OR circuits (called an adders, hereinafter) $8_{11}, 8_{12}, \ldots 8_{1k}$, and the outputs of the delay elements $5_{11}, 5_{12}, \ldots 5_{1k}$ are supplied to the adders $8_{11}, 8_{12}, \ldots 8_{1k}$, and the outputs of the exclusive OR of these two inputs are supplied to the subsequent row of the unit delay elements $5_{21}, 5_{22}, \ldots 5_{2k}$. Likewise, the exclusive OR operations between the outputs of the multipliers $7_{m-2}$, . . . $7_2$ and the outputs of the corresponding unit delay element row are also carried out, and the outputs are simultaneously supplied to the next row of unit delay elements, respectively. Similarly, the elements $y_{11}, y_{12}, \ldots y_{1k}$ of the output vectors of the multiplier $7_1$ and the outputs of the unit delay elements $5_{m-11}, 5_{m-12}, \ldots 5_{m-1k}$ of $(m-1)$th row are exclusively added by the adder $8_{m-11}, 8_{m-12}, \ldots 8_{m-1k}$, and these outputs are shifted to the unit delay elements $5_{m1}, 5_{m2}, \ldots 5_{mk}$ of the final rows, respectively.

The elements $y_{m1}, y_{m2}, \ldots y_{mk}$ of the outputs $Y_m$ of the multiplier $7_m$ are respectively supplied through the lines $11_1, 11_2, \ldots 11_k$ to the multi-level pulse converter (10). The converter (10) feeds out a pulse of level corresponding to the input state vector at the respective clocks, and is functionally similar to the D-A converter (3) shown in FIG. 1.

Then, the operation of the pseudo random multi-level pulse sequence generator will now be described. At first, the respective unit delay elements (5) are set to any state other than a state such that all unit delay elements take the "0" state. The state vector of mth column, $X_m = (x_{m1}, x_{m2}, \ldots x_{mk})$ is supplied to the multiplier $7_i$ $(i = 1, 2, \ldots m)$ at the next clock pulse and the multiplication of the $x_m$ and $h_{m-i}$ $(i = 1, 2, \ldots m)$ are performed on the Galois extension field $GF(2^k)$. The results $y_i = (y_{i1}, y_{i2}, \ldots y_{ik})$ of the multiplication are obtained therein, and the outputs of the unit delay elements $5_{lj}$ and $Y_{(m-l)j}$ $(l = 1, 2, \ldots m-1; j = 1, 2, \ldots k)$ are exclusively added by the adders $8_{lj}$ within the same clock, and the results are shifted to the subsequent unit delay elements $5_{l+1j}$ $(j = 1, 2, \ldots k)$ to be stored. And, the outputs $y_{mj}$ $(j = 1, 2, \ldots k)$ of the multiplying circuit $7m$ are shifted to the delay elements $5_{1j}$ $(j = 1, 2, \ldots k)$ so as to be stored. The aforementioned operations are all operated within the same clock time. Then, the pulses are supplied through k parallel lines $11_1, 11_2, \ldots 11_k$ to the converter (10), corresponding to the values "1" and "0" of the outputs $y_{m1}, y_{m2}, \ldots y_{mk}$. In the next clock, the same operation will be repeated.

Thus, considering the series of parallel pulse trains fed out, the repetition period is verified to be $2^{km}_{}^{1}$ in the same way as for a binary pseudo-random sequence. Thus the randomness becomes more distinguished as the increase in the number m of rows in all unit delay elements. Therefore, the larger the number m is made to be, the smaller the auto-correlation of the sequence of the parallel pulse trains will be, and consequently it is mathematically proven to be random.

Next consider the actual realization of a pseudo-random multi-level pulse generator based on several tap polynomials tabulated before.

Figure 3:
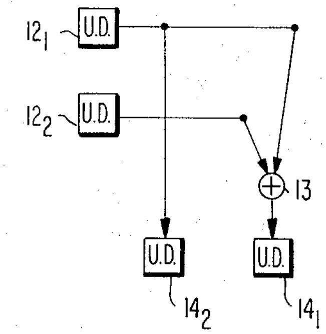
FIGS. 3 and 4 are block diagrams showing multipliers for the multiplication on the Galois extension field $GF(2^2)$ by $(1, 0) = \alpha$ and $(1, 1) = \alpha^2$, respectively.

At first, in case of $4(=2^2)$, it is apparent that each of the $2^2 = 4$ state vectors corresponds respectively to the element (0, 0), (0, 1), (1, 0) and (1, 1) of the Galois extension field $GF(2^2)$. According to the above described reference (1), the circuit for multiplying $(x_2, x_1)$ by $\alpha$ or (1, 0) over the Galois extension field $GF(2^2)$ is shown in FIG. 3. It follows that the contents $x_1$ and $x_2$ stored in the unit delay elements $12_1$ and $12_2$ are summed in the adder 13 in the manner of exclusive OR, and the outputs are supplied to the unit delay element $14_2$, and the content of the element $12_2$ is supplied to the unit delay element $14_1$. The contents $y_1$ and $y_2$ of the elements $14_1$ and $14_2$ represent the product of $(x_2, x_1)$ and $\alpha$.

Figure 4:
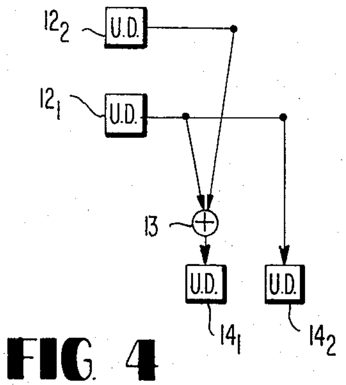

For example, assuming that $(x_2, x_1)$ is (1, 0), the product of this and $\alpha = (1, 0)$ becomes "1" because $x_2 = 1$ is presented as $y_1$ as it is and $y_2$ is the exclusive OR of $x_1 = 0$ and $x_2 = 1$, and resulting $(y_2, y_1) = (1, 1)$. Assuming that $a = 0, b = 1, c = \alpha, d = \alpha^2$, then the product of $(x_2, x_1) = (0, 1) = b$ and $\alpha = (1, 0) = c$ is represented by $d = (1, 1) = \alpha^2$ from the Table 1, and it is understood that the circuit shown in FIG. 3 operates the multiplication between $(x_2, x_1)$ and $\alpha$ over the Galois extension field $GF(2^2)$. Similarly, the circuit for multiplying $(x_2, x_1)$ by $\alpha^2$ or (1, 1) over the Galois extension field $GF(2^2)$ is as shown in FIG. 4, wherein the part corresponding to that in FIG. 3 is designed by the same reference numerals. If $(x_2, x_1)$ is multiplied by $(0, 1) = 1$, the product $(y_2, y_1)$ is the same as $(x_2, x_1)$, and if $(x_2, x_1)$ is multiplied by (0, 0), the product $(y_2, y_1)$ becomes (0, 0).

Figure 5:
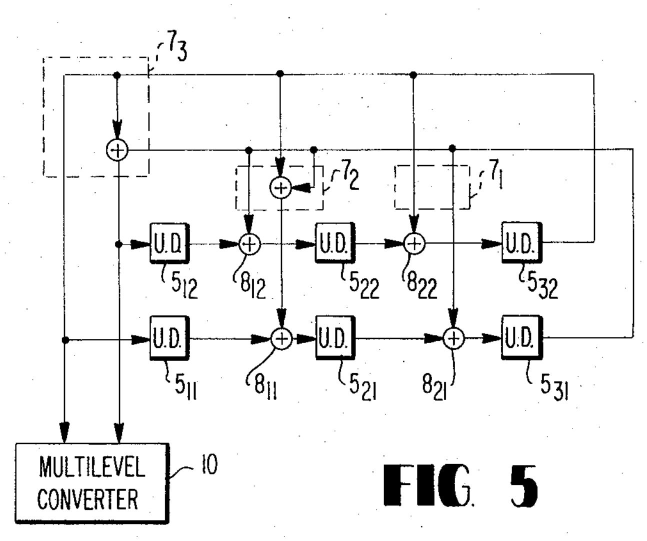
FIGS. 5 and 6 are both block diagrams showing the pseudo-random 4-level pulse sequence generators according to the present invention.

FIG. 5 is one realization of the pseudo-random, 4-level pulse sequence generator wherein the tap polynomial $x^3 - x^2 - \alpha^2 x - \alpha$ is selected from the table of the Tap Polynomials of degree 3 for four elements shown hereinbefore. Since the tap polynomial $h(x) = x^3 - x^2 - \alpha^2 x - \alpha$ is degree 3, two lines of unit delay elements (5) have three rows of the unit delay elements $5_{11}, 5_{21}, 5_{31}; 5_{21}, 5_{22}, 5_{32}$. Since the coefficient of $x^2$ of the tap polynomial is $-1$, the constant $h_2$ of the multiplier $7_1$ becomes $(0,1) = 1$ so that the outputs of the delay elements $5_{31}$ and $5_{32}$ are supplied to the adder $8_{21}$ and $8_{22}$ as they are. The coefficient of the term of the first degree of the tap polynomial is $-\alpha^2$, the outputs of the delay elements $5_{31}$ and $5_{32}$ are multiplied $\alpha^2$ times in the multiplier $7_2$ so as to be supplied to the adders $8_{11}$ and $8_{12}$. The multiplication of $\alpha^2$ is performed by the circuit shown in FIG. 4. Further, since the coefficient of $x^0$ is $-\alpha$, the multiplier $7_2$ multiplies the outputs of the delay elements $5_{31}$ and $5_{32}$ by $\alpha$, and is constituted by the circuit shown in FIG. 3.

Figure 6:
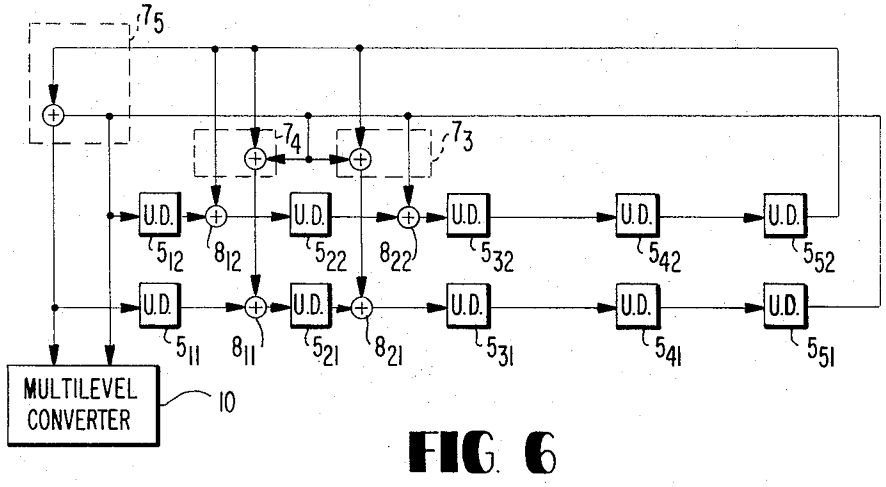
Figure 7:
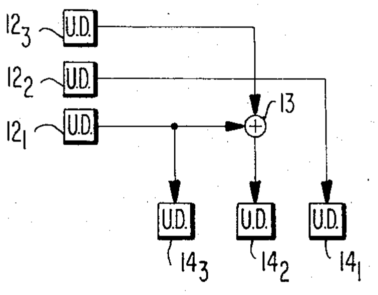
FIGS. 7, 8, 9, 10, 11, and 12 are block diagrams showing multipliers for the multiplication on the Galois extension field $GF(2^3)$ by $(0, 1, 0) = \alpha$, $(1, 0, 0) = \alpha^2$, $(0, 1, 1) = \alpha^3$, $(1, 1, 0) = \alpha^4$, $(1, 1, 1) = \alpha^5$, and $(1, 0, 1) = \alpha^6$, respectively.
Figure 8:
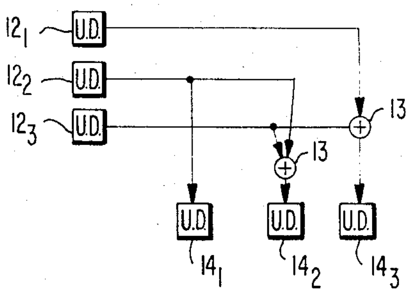
Figure 9:
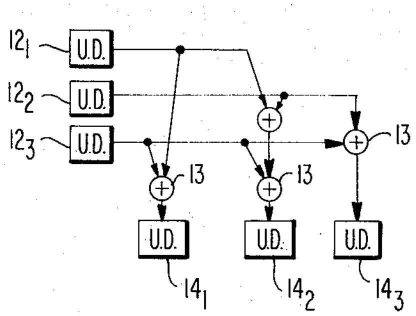

When $x^5 - \alpha^2 x^2 - \alpha x - \alpha^2$ is used as the tap polynomial $h(x)$, the coefficients of $x^4$ and $x^3$ are 0. According to the logical rule hereinbefore, when a state vector $X$ $(x_2, x_1)$ is multiplied by 0, the result is represented by $X = (0, 0)$, and even if (0, 0) is added to the other X $(x_2, x_1)$, it is $(x_2, x_1)$ as it is, and therefore the multipliers $7_1$ and $7_2$ and adders $8_{31}, 8_{32}, 8_{41}$ and $8_{42}$ are cancelled as shown in FIG. 6. Since the coefficients of $x^2$, $x$ and $x^0$ in the polynomial $h(x)$ are $-\alpha^2$, $-\alpha$ and $-\alpha^2$ respectively, the multipliers $7_3$ and $7_5$ may be composed as shown in FIG. 4 and the multiplier $7_4$ is composed as shown in FIG. 3.

In the case of the Galois extension field $GF(2^3)$, that is, in the case of the pseudo-random 8-level pulse sequence generator, each of the $2^3 = 8$ state vectors corresponds to each element of the Galois extension field $GF(2^3)$. According to the reference (1) as aforesaid, the circuits for multiplying $(x_3, x_2, x_1)$ by $\alpha$ or (0, 1, 0), $\alpha^2 = (1, 0, 0)$, $\alpha^3 = (0, 1, 1)$, $\alpha^4 = (1, 1, 0)$, $\alpha^5 = (1, 1, 1)$, $\alpha^6 = (1, 0, 1)$ on the Galois extension field $GF(2^3)$ can be composed as shown in FIGS. 7 to 12. Referring to these drawings, the state vectors $(x_3, x_2, x_1)$ are stored in the unit delay elements $12_3$, $12_2$ and $12_1$, and the state vectors $(y_3, y_2, y_1)$ representing the multiplied results are stored in the unit delay elements $14_3$, $14_2$ and $14_1$. (13) designates an adder. Furthermore, the product between $(x_3, x_2, x_1)$ and (0, 0, 1) is equal to the state vector $(x_3, x_2, x_1)$ as it is, while the product between the ($x_3$, $x_2$, $x_1$) and (0, 0, 0) becomes (0, 0, 0).

Figure 10:
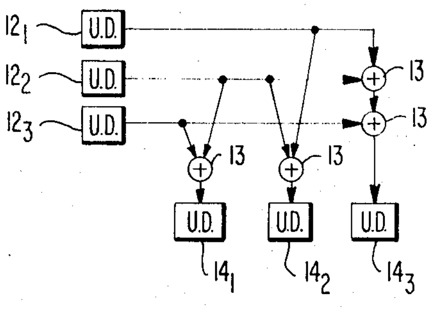
Figure 11:
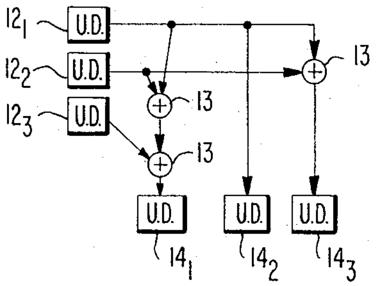
Figure 12:
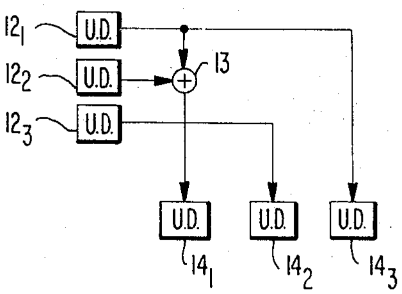
Figure 13:
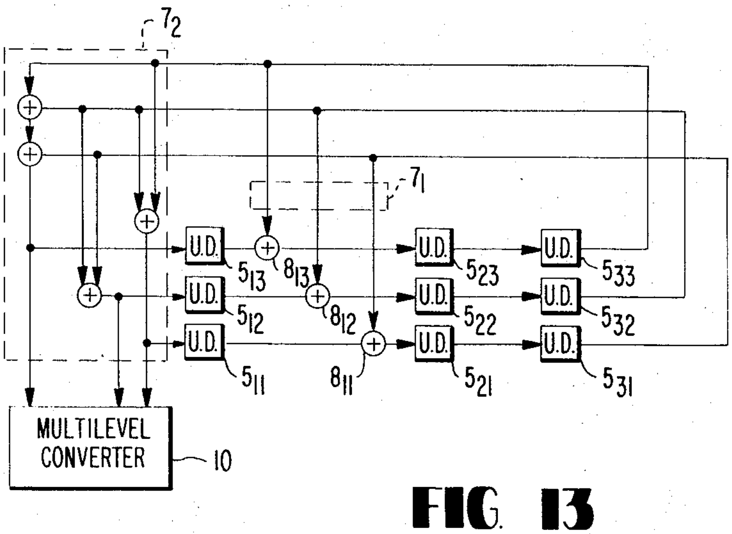
FIGS. 13 and 14 are both block diagrams showing, pseudo-random 8-level pulse sequence generators according to the present invention.
Figure 14:
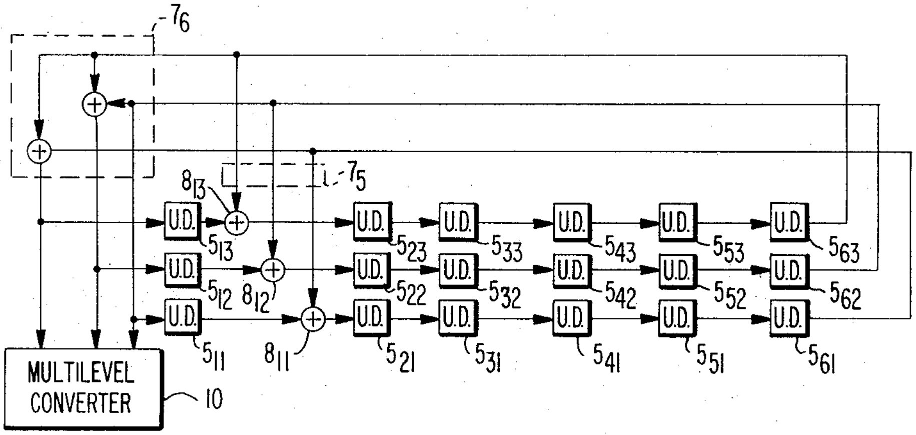

The examples of the pseudo random 8-level pulse series generator derived from such facts are shown in FIGS. 13 and 14. In FIG. 13, the multiplier $7_1$ and adder $8_{21}$, $8_{22}$, $8_{23}$ are omitted, the multiplier $7_2$ multiplies by 1, and the multiplier $7_3$ is as shown in FIG. 10 in circuit to multiply by $\alpha^4$. In FIG. 14, the multiplier $7_6$ multiplies by $\alpha^2$ consisting of the circuits shown in FIG. 8.

Likewise, the device to generate the pseudo-random multi-level pulse sequences of 16 (= $2^4$) or more level which is generally indicated at $2^k$ can be realized.

Figure 15:
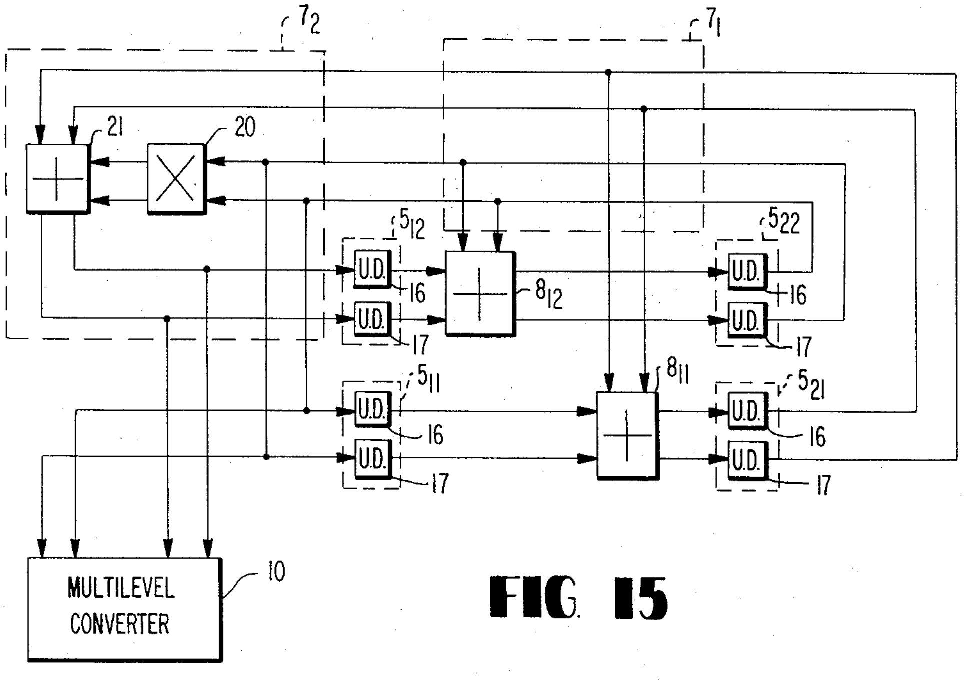
FIG. 15 is a block diagram showing the pseudo-random 9-level pulse sequence generator according to the present invention.

Eventhough all the realizations described so far are concerned with the number of multi-levels as a power $k$ of 2, the present invention may also be applied to the cases where the number of levels is a power of $p$, which is a prime number other than 2. In such applications, the states which can be taken by each of the unit-delay elements shown in FIG. 2 are not limited to the above described "0" and "1" but generally p states can be taken in each unit delay element. Such an element can be realized, for example, by the parallel combination of unit delay elements (such as flip-flop registers) for bi- FIG. 15. Since the Tap polynomial has degree 2, the unit delay elements to store 3 states are arranged in 2 columns, and such an element can be composed of combination of two unit-delay elements such as flip-flop registers each of which can store two states. More specifically, since a pair of unit delay elements can take the four states, (0, 0), (0, 1), (1, 0), (1, 1), one of them, for example, the state (1, 1) is to be inhibited therefrom, and the other three states may be represented by a pair of unit delay elements 16 and 17 in FIG. 15.

Since the coefficient of x in the tap polynomial is −1 the outputs of the elements $5_{21}$ and $5_{22}$ are multiplied by one in the multiplier $7_1$. That is, the outputs of the elements $5_{21}$ and $5_{22}$ are supplied to the adder $8_{11}$ and $8_{12}$ as they are. Since the coefficient of $x^0$ is $-\alpha$, the outputs of the elements $5_{21}$ and $5_{22}$ are multiplied twice by the multiplier $7_2$. The adders $8_{11}$ and $8_{12}$ are of course adders of modulo 3 respectively.

Assuming that the product modula 3 of the ($x_1$, $x_2$) and ($y_1$, $y_2$) is ($z_1$, $z_2$) and 0 = (0, 0), 1 = (0, 1), 2 = (1, 0), then the following table can be obtained. However, the state (1, 1) is inhibited therefrom.

| $x_1$ | $x_2$ | $y_1$ | $y_2$ | $z_1$ | $z_2$ | $x_1$ | $x_2$ | $y_1$ | $y_2$ | $z_1$ | $z_2$ | $x_1$ | $x_2$ | $y_1$ | $y_2$ | $z_1$ | $z_2$ |
|---|---|---|---|---|---|---|---|---|---|---|---|---|---|---|---|---|---|
| 0 | 0 | 0 | 0 | 0 | 0 | 0 | 1 | 0 | 0 | 0 | 0 | 1 | 0 | 0 | 0 | 0 | 0 |
| 0 | 0 | 0 | 1 | 0 | 0 | 0 | 1 | 0 | 1 | 0 | 1 | 1 | 0 | 0 | 1 | 1 | 0 |
| 0 | 0 | 1 | 0 | 0 | 0 | 0 | 1 | 1 | 0 | 1 | 0 | 1 | 0 | 1 | 0 | 0 | 1 |

nary pulses. This will be clarified hereinafter. Furthermore, as in the above described cases for $p = 2$, $p^k$ ($p \neq 2$) states may also be expressed by parallel disposed $k$ lines of elements, each may take $p$ values. Also, modulo p addition rather than modulo 2 addition is used, the parameters $h_i$ ($i = 0, 1, 2, \ldots m-1$) are replaced by the parameters belonging to the Galois extension field GF($p^k$), and the multiplier circuit multiplier over the Galois extension field GF($p^k$) rather than GF($2^k$). The result is a device which generates a pluse sequence of $p^k$ ($p \neq 2$) levels in the same manner as in the above described realizations.

In this case, the constant parameters $h_i$ ($i = 0, 1, 2, \ldots m-1$) are so selected that the Tap Polynomial $h(x)$ satisfies following conditions:

1. There exists no such a polynomial with coefficients from GF($p^k$), degree more than one that divides $h(x)$.
2. h(x) divides $x^n - 1$ if $n = (p^k)^m - 1$, but does not divide $x^n - 1$ if $n < (p^k)^m - 1$. The division here is, of course, performed on GF($p^k$). The polynomial $h(x)$ satisfying these conditions can be easily searched by a computer.

For practical examples, a case of $p = 3$, $k = 2$, namely $3^2$ = 9-levels will be described in detail hereinafter. First, as a Tap Polynomial satisfying the above conditions, a second order polynomial $x^2 - x - \alpha$ is consid- It is easy to synthesize a logic circuit by forming a logic formula from the table.

Figure 16:
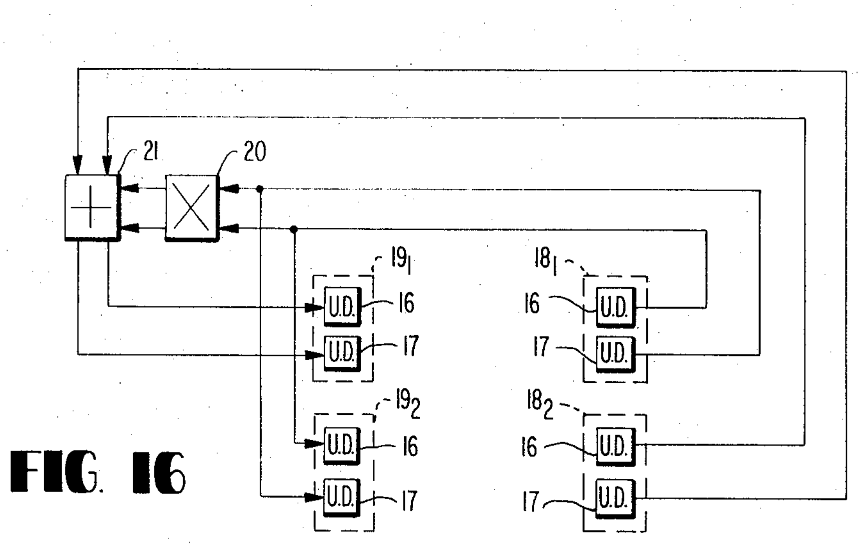
FIG. 16 is a block diagram showing a multiplier for the multiplication over the Galois extension field $GF(3^2)$ by $(1, 0) = \alpha$.

The multiplier for multiplying by $\alpha$ may be composed as shown in FIG. 16 according to the reference (1). Assuming that the state of the elements 16 and 17 in the unit delay element $18_1$ is ($x_{11}$, $x_{12}$), the state of the elements 16, 17 in the element $18_2$ is ($x_{21}$, $x_{22}$), the state of the elements 16, 17 in the unit delay element $19_1$ is ($y_{11}$, $y_{12}$), the state of the elements (16), (17) in the element $19_2$ is ($y_{21}$, $y_{22}$), and 9 values of the elements $18_1$, $18_2$ or $19_1$ and $19_2$ are expressed by (($x_{11}$, $x_{12}$)($x_{21}$, $x_{22}$)) or (($y_{11}$, $y_{12}$)($y_{21}$, $y_{22}$)). Herein, $x_{i,j}$ and $y_{i,j}$ are equal to "1" or "0" ($i$ = 1, 2).

Thus, the value indicated by the state ($x_{11}$, $x_{12}$) in the element $18_1$ is multiplied by 2 at the multiplier 20 of modulo 3 and the result and the value indicated by the state ($x_{21}$, $x_{22}$) in the element $18_2$ are summed in the adder 21 of modulo 3, and the result is represented as the state ($y_{11}$, $y_{12}$) in the element $19_1$. On the other hand, the state ($x_{11}$, $x_{12}$) of the element $18_1$ constitutes by itself the state ($y_{21}$, $y_{22}$) in the element $19_2$. It should be noted that all of the above operations are performed at every clock time.

Assuming that the sum modulo 3 of the ($x_1$, $x_2$) and ($y_1$, $y_2$) is ($z_1$, $z_2$) and 0 = (0, 0), 1 = (0, 1), 2 = (1, 0), they may be expressed as in the following table. However, the state (1, 1) is inhibited therein.

| $x_1$ | $x_2$ | $y_1$ | $y_2$ | $z_1$ | $z_2$ | $x_1$ | $x_2$ | $y_1$ | $y_2$ | $z_1$ | $z_2$ | $x_1$ | $x_2$ | $y_1$ | $y_2$ | $z_1$ | $z_2$ |
|---|---|---|---|---|---|---|---|---|---|---|---|---|---|---|---|---|---|
| 0 | 0 | 0 | 0 | 0 | 0 | 0 | 1 | 0 | 0 | 0 | 1 | 1 | 0 | 0 | 0 | 1 | 0 |
| 0 | 0 | 0 | 1 | 0 | 1 | 0 | 1 | 0 | 1 | 1 | 0 | 1 | 0 | 0 | 1 | 0 | 0 |
| 0 | 0 | 1 | 0 | 1 | 0 | 0 | 1 | 1 | 0 | 0 | 0 | 1 | 0 | 1 | 0 | 0 | 1 |

ered. Herein, in accordance with the reference (1), following expressions are possible.

(0, 0) = 0, (0, 1) = 1, (1, 0) = $\alpha$, (2, 1) = $\alpha^2$, (2, 2) = $\alpha^3$, (0, 2) = $\alpha^4$, (2, 0) = $\alpha^5$, (1, 2) = $\alpha^6$, (1, 1) = $\alpha^7$ A pseudo-random 9-level pulse sequence generator with tap polynomial $h(x) = x^2 - x - \alpha$ is indicated in It is easy to synthesize a logic circuit by forming a logic formula from the table.

As is apparent from the above description, the pseudo random multi-level pulse generator may be composed by simple circuit, and the randomness of the resultant pulse is mathematically assured.

When the auto-correlation of the pseudo random 4-level pulse sequence of the present invention is compared with that of the pseudo random 4-level pulse sequence of the conventional method, it will be found that the auto-correlation of the former is smaller than that of the latter, and therefore, the former has better randomness.

Figures 17, 18:
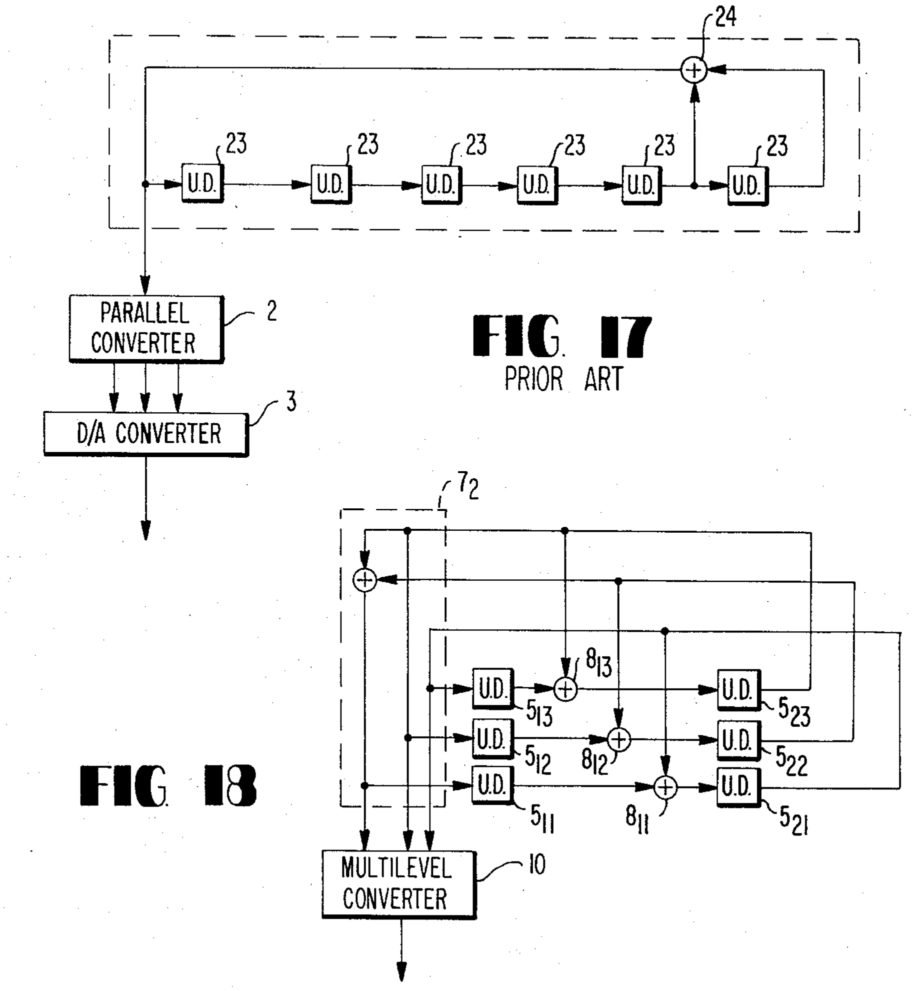
FIG. 17 is a block diagram showing a conventional pseudo-random 8-level pulse generator.
FIG. 18 is a block diagram showing the pseudo-random 8-level pulse generator according to the present invention.

Herein, both the former and the latter generators are assumed to have equal unit delay elements. FIG. 17 is a conventional circuit, wherein a shift register is composed of 7 stages of flip-flop circuits 23, connected in cascade, the input and output of the last stage of the flip-flop circuits 23 being supplied to an adder 24 to perform an exclusive OR operation therein, the output of the adder 24 being fedback to the initial stage of the flip-flop circuits 23, whereby 2-level random pulse generator 1 is constituted.

The 2-level random pulse train from the generator 1 is converted in a parallel converter 2 into three rows of binary pluse trains as previously described with reference to FIG. 1, and three rows of parallel pulse trains are thereafter converted in a D-A converter 3 into a multilevel pulse series having a multilevel such as (000) into −1, (001) into 1, (010) into 3, (011) into −3, (100) into 5, (101) into −5, (110) into 7, and (111) into −7.

Figure 19:
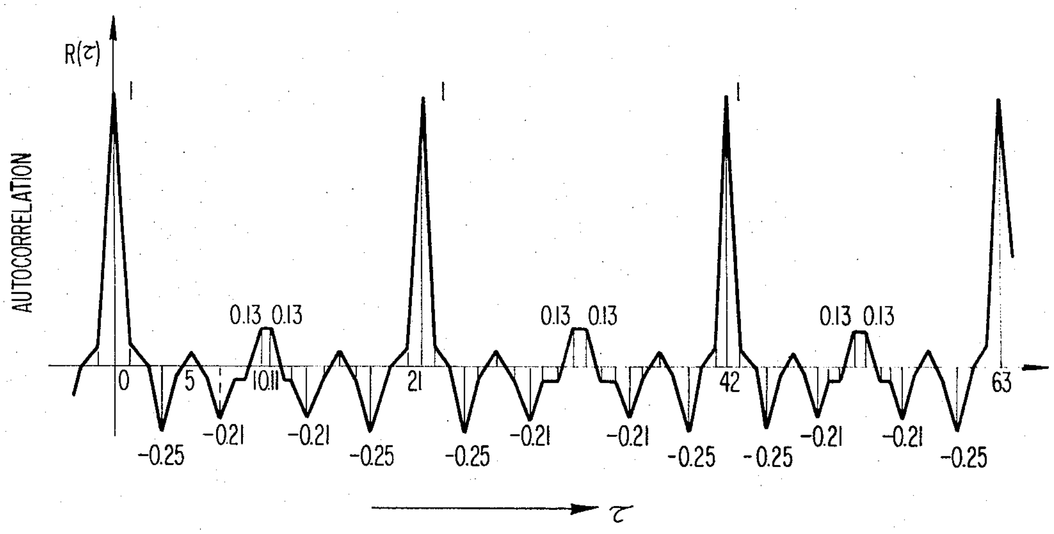
FIG. 19 is a graphical representation of auto-correlation of output pulse sequences from a pulse generator shown in FIG. 17.

The auto-correlation of the output pulse series thus obtained is indicated in FIG. 19.

In FIG. 18, there is indicated a random 8-level pulse sequence generator wherein $p = 2$, $k = 3$, $m = 2$, and the Tap Polynomial $X^2 - X - \alpha^6$ are selected. The auto-correlation of the random 8-level pulse sequence from this device is indicated in FIG. 20.

Figure 20:
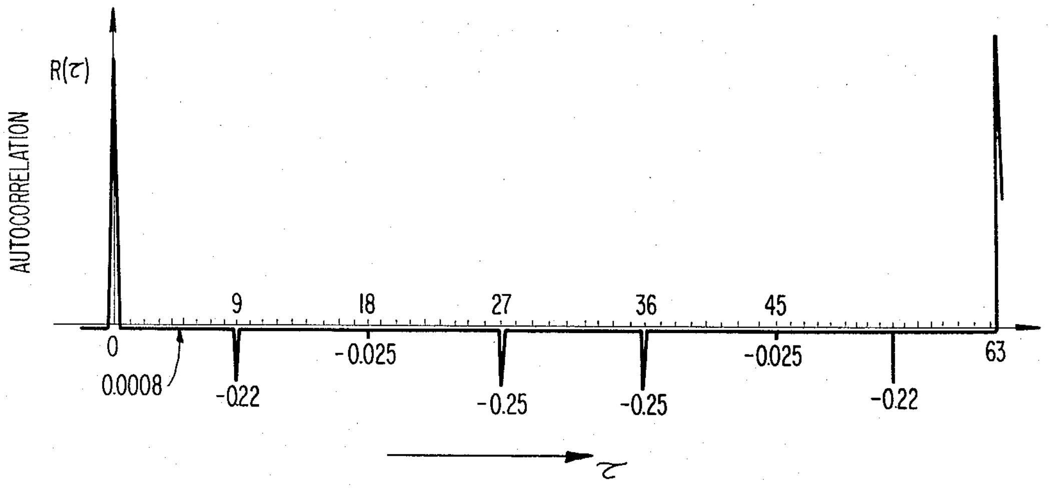
FIG. 20 is a graphical representation of auto-correlation of output pulse sequences from a pulse generator shown in FIG. 18.

Comparing the results shown in FIGS. 19 and 20, it will be easily found that the pulse sequences obtained by the pulse sequence generator according to the present invention has far smaller autocorrelation than that of the conventional pulse sequences, whereby the randomness of the former is superior than that of the latter.

I claim:

1. A pseudo-random multi-level pulse sequence generator comprising a. m columns of unit delay means for storing m output state vector $X_i$ where $i = 1, 2 \ldots m$, which are elements of a Galois field, b. means for individually multiplying the output state vector $X_m$ from the last column of unit delay means by each $h_i$, where $i = 0, 1, 2 \ldots m-1$ and where each $h_i$ is an element of the same Galois extension field and multiplication is over the Galois extension field, c. means for adding over the Galois extension field $Y_i$ and $X_i$ for $i = 1, 2 \ldots m-1$, where $Y_i$ is the product of $X_m$ and $h_i$, and periodically shifting the resultant sum to the column $i+1$ delay unit means, the resultant sum being the new $X_{i+1}$, d. means for periodically shifting $Y_o$, which is the product of $X_m$ and $h_o$ into the first ($i = 1$) column of unit delay means to form the new state vector $X_i$, and e. means for converting the element $Y_o$ into a multilevel pulse, wherein said multiplying means may be a direct input output connection for $h_i = 1$ and the absence of any connection for $h_i = 0$.

2. A pseudo-random multi-level pulse sequence generator as claimed in claim 1 wherein said state vectors $X_i$, said parameters $h_i$ and products $Y_i$ are elements of a Galois extension field $GF(p^k)$ and wherein each column of unit delay means comprises k individual unit delay means, and p is a prime number.

3. A pseudo-random multi-level pulse sequence generator as claimed in claim 2 wherein said parameter $h_i$, $i = 0, 1, \ldots m-1$, satisfy the following conditions for the tap polynomial with one variable $x$, $h(x) = x^m - h_{m-1}x^{m-1} - h_{m-2}x^{m-2} - h_i x - h_o$ where additions and multiplications are over the Galois field $GF(p^k)$, said conditions being, a. there exists no such a polynomial with coefficients from $GF(p^k)$, of a degree more than one that divides $h(x)$; and b. $h(x)$ divides $x^n - 1$ if $n = (p^k)^m - 1$, but does not divide $x^n - 1$ if $n < (p^k)^m - 1$.

4. A pseudo-random multi-level pulse sequence generator as claimed in claim 3 wherein said multi-level pulses are $(p^k)$ - level pulses and wherein each of said individual unit delay means is capable of storing $p$ values.

5. A pseudo-random multi-level pulse sequence generator as claimed in claim 3 wherein each said unit delay means comprises $n$ flip-flop where $2^{n-1} \leq p \leq 2^n$.

* * * * *